US012708841B2

(12) United States Patent
Ishikawa et al.

(10) Patent No.: US 12,708,841 B2
(45) Date of Patent: Aug. 18, 2026

(54) INFORMATION PROCESSING SYSTEM, CONTROLLER APPARATUS, CONTROL METHOD THEREFOR, AND PROGRAM

(71) Applicant: Sony Interactive Entertainment Inc., Tokyo (JP)

(72) Inventors: Kiyotaka Ishikawa, Tokyo (JP); Shin Kimura, Kanagawa (JP); Masaaki Tonogai, Tokyo (JP); Takuro Sawada, Tokyo (JP); Kazuyoshi Enomoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 237 days.

(21) Appl. No.: 18/689,430

(22) PCT Filed: Sep. 13, 2021

(86) PCT No.: PCT/JP2021/033551

§ 371 (c)(1),
(2) Date: Mar. 6, 2024

(87) PCT Pub. No.: WO2023/037548

PCT Pub. Date: Mar. 16, 2023

(65) Prior Publication Data

US 2024/0382829 A1 Nov. 21, 2024

(51) Int. Cl.

*A63F 13/20* (2014.01)
*A63F 13/212* (2014.01)
*A63F 13/214* (2014.01)

(52) U.S. Cl.

CPC ............ *A63F 13/20* (2014.09); *A63F 13/212* (2014.09); *A63F 13/214* (2014.09);
(Continued)

(58) Field of Classification Search

CPC ...... A63F 13/20; A63F 13/212; A63F 13/214; A63F 2300/10; A63F 2300/1012; A63F 2300/1068
(Continued)

(56) References Cited

U.S. PATENT DOCUMENTS 5,779,548 A 7/1998 Asai et al.
7,347,780 B1 3/2008 Best
(Continued)

FOREIGN PATENT DOCUMENTS

CN 101479782 A 7/2009
CN 101981589 A 2/2011
(Continued)

OTHER PUBLICATIONS

Elecom.co.jp [online], "16 Button type and PS 3/PC, which can share a lots of shortcut and 12 button type high performance USB game pads 2 products which are compatible with each other," available on or before Jul. 17, 2009, via Internet Archive: Wayback Machine URL <https://web.archive.org/web/20090717154657/https:/www.elecom.co.jp/news/200907/jc-u3016f/>, retrieved on Sep. 12, 2025, retrieved from URL<https:/www.elecom.co.jp/news/200907/jc-u3016f/>, 7 pages (with Machine Translation).
(Continued)

*Primary Examiner* — Allen Chan
(74) *Attorney, Agent, or Firm* — Fish & Richardson P.C.

(57) ABSTRACT

An information processing system includes a controller apparatus that is operated by a user in a contact manner and an information processing apparatus that is connected with the controller apparatus. The controller apparatus works in an operation state of either a first state of receiving a user operation and transmitting information regarding the received operation to the information processing apparatus or a second state of executing a predetermined process based
(Continued)

on the user contact state, the first state being different from the second state.

20 Claims, 4 Drawing Sheets

(52) U.S. Cl.
CPC ... *A63F 2300/10* (2013.01); *A63F 2300/1012* (2013.01); *A63F 2300/1068* (2013.01)

(58) Field of Classification Search
USPC ........................................................... 463/37
See application file for complete search history.

(56) References Cited

U.S. PATENT DOCUMENTS

| | | | |
|---|---|---|---|
| 8,128,503 | B1 | 3/2012 | Haot et al. |
| 8,543,622 | B2 | 9/2013 | Giblin |
| 8,597,123 | B2 | 12/2013 | Tanaka et al. |
| 9,242,173 | B2 | 1/2016 | Kwon |
| 10,516,724 | B2 | 12/2019 | Takaichi et al. |
| 10,635,171 | B2 * | 4/2020 | Nakamura .............. G06F 3/016 |
| 11,033,816 | B2 | 6/2021 | Takaichi et al. |
| 11,577,165 | B2 | 2/2023 | Takaichi et al. |
| 11,813,518 | B2 * | 11/2023 | Ishikawa ................. A63F 13/24 |
| 11,857,869 | B2 * | 1/2024 | Rogoza ................. G06F 3/0338 |
| 11,951,392 | B2 | 4/2024 | Takaichi et al. |
| 12,274,938 | B2 | 4/2025 | Takaichi et al. |
| 2001/0001091 | A1 | 5/2001 | Asai et al. |
| 2003/0001847 | A1 | 1/2003 | Doyle et al. |
| 2003/0032467 | A1 | 2/2003 | Mayer et al. |
| 2004/0250286 | A1 | 12/2004 | Fraser et al. |
| 2006/0205518 | A1 | 9/2006 | Malabuyo et al. |
| 2007/0173329 | A1 | 7/2007 | Landsem |
| 2008/0113812 | A1 | 5/2008 | Kwon |
| 2008/0141131 | A1 | 6/2008 | Cerny et al. |
| 2008/0256463 | A1 | 10/2008 | Li et al. |
| 2009/0013117 | A1 | 1/2009 | Huang |
| 2009/0131177 | A1 | 5/2009 | Pearce |
| 2009/0209335 | A1 | 8/2009 | Pearce |
| 2010/0224420 | A1 | 9/2010 | Miyanaga |
| 2011/0010722 | A1 | 1/2011 | Matsuyama |
| 2011/0083111 | A1 | 4/2011 | Forutanpour et al. |
| 2011/0276881 | A1 | 11/2011 | Keng et al. |
| 2012/0027256 | A1 | 2/2012 | Kiyohara et al. |
| 2012/0086630 | A1 | 4/2012 | Zhu et al. |
| 2012/0162251 | A1 | 6/2012 | Minamino et al. |
| 2012/0276998 | A1 | 11/2012 | Zhu et al. |
| 2013/0130800 | A1 | 5/2013 | Sirilux et al. |
| 2013/0239003 | A1 | 9/2013 | Usenko et al. |
| 2014/0040803 | A1 | 2/2014 | Briand |
| 2014/0053078 | A1 | 2/2014 | Kannan |
| 2014/0075385 | A1 | 3/2014 | Wan et al. |
| 2015/0281325 | A1 | 10/2015 | Takaichi et al. |
| 2016/0045832 | A1 | 2/2016 | Pearce |
| 2016/0048989 | A1 | 2/2016 | Gabbidon |
| 2018/0374386 | A1 | 12/2018 | Benefield et al. |
| 2019/0369801 | A1 * | 12/2019 | Wilkinson ............ G06F 3/0445 |
| 2020/0084261 | A1 | 3/2020 | Takaichi et al. |
| 2020/0341549 | A1 * | 10/2020 | Ishikawa ............... A63F 13/211 |
| 2021/0252383 | A1 * | 8/2021 | VanWyk ................. G06F 3/165 |
| 2021/0260477 | A1 | 8/2021 | Takaichi et al. |
| 2023/0141701 | A1 | 5/2023 | Takaichi et al. |
| 2024/0207733 | A1 | 6/2024 | Takaichi et al. |
| 2025/0161796 | A1 | 5/2025 | Kitamura et al. |
| 2025/0195998 | A1 | 6/2025 | Takaichi et al. |

FOREIGN PATENT DOCUMENTS

| | | | |
|---|---|---|---|
| CN | 102075618 | A | 5/2011 |
| CN | 102441276 | A | 5/2012 |
| CN | 102646161 | A | 8/2012 |
| EP | 2098271 | A2 | 9/2009 |
| EP | 2441505 | A2 | 4/2012 |
| EP | 2515513 | A1 | 10/2012 |
| JP | H07-261922 | A | 10/1995 |
| JP | 2000-333121 | A | 11/2000 |
| JP | 2001-006270 | A | 1/2001 |
| JP | 2003-117239 | A | 4/2003 |
| JP | 2005-318987 | A | 11/2005 |
| JP | 2006-006853 | A | 1/2006 |
| JP | 2006-180411 | A | 7/2006 |
| JP | 2008-532687 | A | 8/2008 |
| JP | 2009-504098 | A | 1/2009 |
| JP | 2010-000119 | A | 1/2010 |
| JP | 2010-035968 | A | 2/2010 |
| JP | 2010-517186 | A | 5/2010 |
| JP | 2011-512172 | A | 4/2011 |
| JP | 2011-090348 | A | 5/2011 |
| JP | 2012-069096 | A | 4/2012 |
| JP | 2012-096027 | A | 5/2012 |
| JP | 2012-125644 | A | 7/2012 |
| JP | 2013-003911 | A | 1/2013 |
| JP | 2014-092991 | A | 5/2014 |
| JP | 2015-015600 | A | 1/2015 |
| JP | 2021-184216 | A | 12/2021 |
| JP | 2022-003453 | A | 1/2022 |
| KR | 10-2010-0118986 | A | 11/2010 |
| RU | 2402068 | C2 | 10/2010 |
| RU | 2408085 | C2 | 12/2010 |
| WO | WO 1996/000601 | A1 | 1/1996 |
| WO | WO 2001/025944 | A1 | 4/2001 |
| WO | WO 2003/081447 | A1 | 10/2003 |
| WO | WO 2009/073795 | A1 | 6/2009 |
| WO | WO 2009/094611 | A2 | 7/2009 |
| WO | WO 2011/041427 | A2 | 4/2011 |
| WO | 2015/019593 | A1 | 2/2015 |
| WO | 2020/079852 | A1 | 4/2020 |

OTHER PUBLICATIONS

Gamers-infor.net [online], "[Nintendo Switch] How to take screenshots and 30-second gameplay videos," May 10, 2024, retrieved on Sep. 12, 2025, retrieved from URL <2021/info.net/Nintendo, https://gamers-info.net/nintendo-switch-picture-movie/>, 28 pages (with Machine Translation).

International Preliminary Report on Patentability in International Appln. No. PCT/JP2021/033551, mailed on Mar. 28, 2024, 11 pages (with English Translation).

Written Opinion in International Appln. No. PCT/JP2021/033551, mailed on Nov. 2, 2021, 8 pages (with English Translation).

International Search Report and Written Opinion mailed on Nov. 2, 2021, received for PCT Application PCT/JP2021/033551, filed on Sep. 13, 2021, 09 pages including English Translation.

* cited by examiner (a)
(b)
(c)
1
2
10
11
12
15
16
17
20
21
22
31
32
33
35

| HAND WIDTH W | MIDDLE FINGER MM | RING FINGER RM | LITTLE FINGER PM | MIDDLE FINGERTIP MF | RING FINGERTIP RF | LITTLE FINGERTIP PF |
|---|---|---|---|---|---|---|
| 4 | 22A | 22C | 22D | 22G | 22I | 22J |
| 5 | 22A | 22C | 22F | 22G | 22I | 22L |
| 6 | 22A | 22D | 22F | 22G | 22J | 22L |

INFORMATION PROCESSING SYSTEM, CONTROLLER APPARATUS, CONTROL METHOD THEREFOR, AND PROGRAM

CROSS-REFERENCE TO RELATED APPLICATION

The present application is based on International Patent Application No. PCT/JP2021/033551, filed Sep. 13, 2021, the content of which is hereby incorporated by reference.

TECHNICAL FIELD

The present invention relates to an information processing system, a controller apparatus, a control method therefor, and a program.

BACKGROUND ART

There have been a variety of controller apparatuses for use with home video game machines and the like. Operation methods therefor are also becoming diverse. For example, some controller apparatuses are assumed to be used while being mounted on a user's hand.

Further, in recent years, a controller apparatus is often used with a head mounted display mounted on a user.

SUMMARY

Technical Problem

Since controller apparatuses have become diverse as described above and controller apparatuses are used with head mounted displays mounted, for example, users using the controller apparatuses cannot visually recognize the surrounding situations in some cases.

The present invention has been made in view of the above-mentioned circumstances, and one object thereof is to provide an information processing system, a controller apparatus, a control method therefor, and a program for assisting use of a controller apparatus in a variety of situations.

Solution to Problem

One aspect of the present invention for solving the problem in the conventional problems is an information processing system including a controller apparatus that is operated by a user in a contact manner, and an information processing apparatus that is connected with the controller apparatus. The controller apparatus works in an operation state of either a first state of receiving a user operation and transmitting information regarding the received operation to the information processing apparatus or a second state of executing a predetermined process based on a user contact state, the second state being different from the first state.

Advantageous Effect of Invention

According to the present invention, it makes possible to assist use of a controller apparatus in a variety of situations.

BRIEF DESCRIPTION OF DRAWINGS

FIG. 4 is a flowchart of an operation example of an information processing system according to the embodiment of the present invention.

FIG. 5 is a flowchart of an operation example of the controller apparatus according to the embodiment of the present invention.

DESCRIPTION OF EMBODIMENT

Hereinafter, an embodiment of the present invention will be explained with reference to the drawings. An information processing system 100 according to an embodiment of the present invention includes a controller apparatus 1 and an information processing apparatus 2. The controller apparatus 1 according to one example of the present embodiment is used while being mounted on a user's hand. The present embodiment, however, is not limited to the controller apparatus 1 of such a type. The controller apparatus 1 may be operated while being held by a hand, for example.

Figure 1:
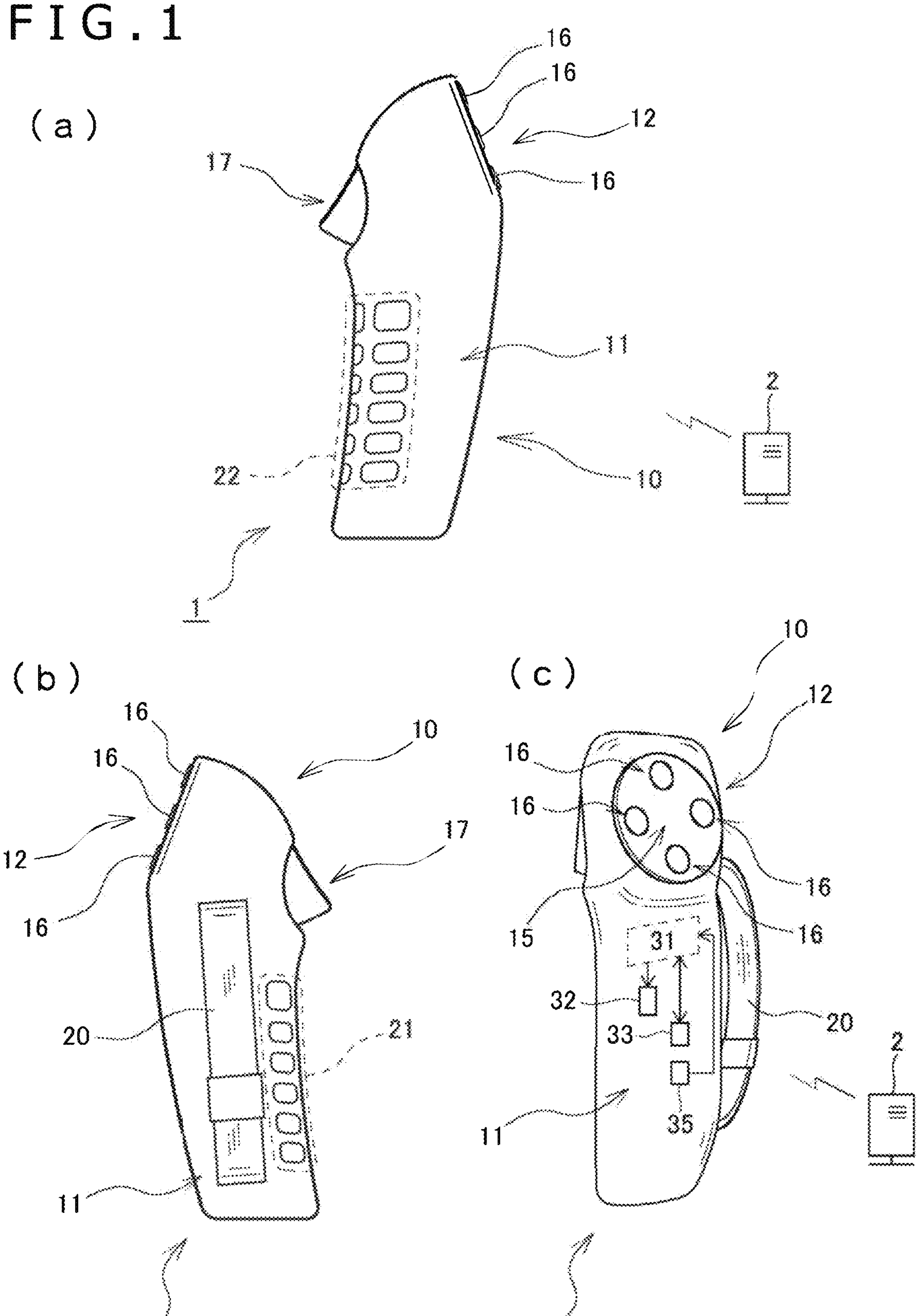
FIG. 1 depicts schematic diagrams depicting a configuration of a controller apparatus and a connection example thereof according to an embodiment of the present invention.

The controller apparatus 1 according to this example, which is used while being mounted on a hand, includes a controller main body 10 and a fixing tool 20 that maintains the positional relation between the controller main body 10 and a user's hand, as depicted in FIG. 1. The controller apparatus 1 is connected with the information processing apparatus 2 in a wiredly or wirelessly communicable manner.

The sizes, ratio, arrangement, etc. of sections in the following explanation regarding the present embodiment are mere examples. The present embodiment is not limited to the ratio and arrangement which are depicted, for example, in the drawings.

FIG. 1(*a*) is a left side view of the controller apparatus 1 according to the embodiment of the present invention, FIG. 1(*b*) is a right side view of the controller apparatus 1, and FIG. 1(*c*) is a substantially perspective view of the front surface of the controller apparatus 1 viewed from a slightly left side.

The fixing tool 20 of the controller apparatus 1 is a ring-shaped belt member having both ends fixed to the controller main body 10, for example. Four fingers from an index finger to a little finger of a user are put between the fixing tool 20 and the controller main body 10, and the belt member of the fixing tool 20 is fastened (the clearance between the fixing tool 20 and the controller main body 10 is reduced) such that the controller main body 10 is brought into contact with the palm. Accordingly, the controller main body 10 is mounted on the user's hand. Since the controller apparatus 1 is mounted on the hand with the fixing tool 20 in such a manner, the controller main body 10 is prevented from coming off the user's hand even if the user holding the controller main body 10 (holding the controller main body 10 with the fingers put around the controller main body 10) extends the fingers.

It is to be noted that which hand between a right hand or a left hand the controller apparatus 1 is mounted on depends on the position of the fixing tool 20. For example, the controller apparatus 1 in FIG. 1 is assumed to be mounted on a right hand because the fixing tool 20 is disposed on the right side surface.

The controller main body 10 includes a grip section 11 that can be gripped by at least a part (the middle finger to the little finger in this example) of the user's fingers inserted in the fixing tool 20, and an operation section 12. The grip section 11 substantially has a polygon column shape. The operation section 12 is formed to be continuous with the grip section 11. In addition, the front side surface of the operation section 12 includes a sensor section 15 and a button operation section 16, and the rear side surface of the operation section 12 includes a swing button 17. In addition, a control section 31, a vibration device 32 such as a vibrator, and a communication section 33 are included inside the operation device 10.

In the example in FIG. 1, the index finger of the user is placed in a position in which the index finger is able to operate the swing button 17 of the operation section 12 while the thumb of the user is placed in a position in which the index finger is able to reach a button included in the button operation section 16 on the front surface side. In this state, the middle finger, the ring finger, and the little finger of the user can hold the grip section 11 (these fingers can be put around the grip section 11).

In addition, at least one first sensor 21 that outputs a value corresponding to a spatial position displacement of each finger of the user and detects whether or not each finger of the user is coming close to a surface of the grip section 11 is disposed in a position, on the grip section 11, with which the bases of the middle finger, the ring finger, and the little finger of the user are in contact when the user is holding the controller main body 10. The first sensor 21 includes an electrostatic sensor 21S and a sensor circuit 21C that converts a detection result obtained by the electrostatic sensor 21S to an electric signal and that outputs the electric signal, for example (the electrostatic sensor 21S and the sensor circuit 21C are collectively illustrated as the first sensor 21 in FIG. 1).

Next, an arrangement example of the first sensors 21 and second sensors 22 according to one example of the present embodiment will be explained with reference to FIG. 2.

In the example of the present embodiment, a plurality of the first sensors 21 are arranged substantially in a line along the longitudinal direction of the grip section 11 over a length that is longer than the average hand width of adults. Six first sensors 21 are arranged in a line in the example in FIG. 2, but the number of the first sensors 21 is not limited to six.

Further, a plurality of the second sensors 22 that each detect the distance to the corresponding finger of the user are arranged discretely (without having the overlapping detection areas) in positions, on the controller main body 10, with which a part extending from the finger pads to the tips of the user's middle finger, ring finger, and little finger are in contact when the user is holding the controller main body 10. Each of the second sensors 22 also includes an electrostatic sensor 22S and a sensor circuit 22C that converts a detection result obtained by the electrostatic sensor 22S to an electric signal and that outputs the electric signal (the electrostatic sensor 22S and the sensor circuit 22C are collectively illustrated as the second sensor 22 in FIG. 1). Further, each of the second sensors 22 also outputs a value corresponding to a spatial position displacement of the corresponding finger of the user.

In one example of the present embodiment, the plurality of second sensors 22 are arranged in a matrix (in two dimensions). In FIG. 2, six second sensors 22 are arranged in two columns along the longitudinal direction of the grip section 11. However, the present embodiment is not limited to this arrangement of 6 rows×2 columns. Any arrangement can be adopted as long as the second sensors 22 can detect bending and extending of the corresponding fingers while being disposed in a range, on the controller main body 10, with which a part extending from the finger pads to the tips of the user's fingers is in contact when the user is holding the grip section 11 of the controller main body 10.

Figures 2, 3:
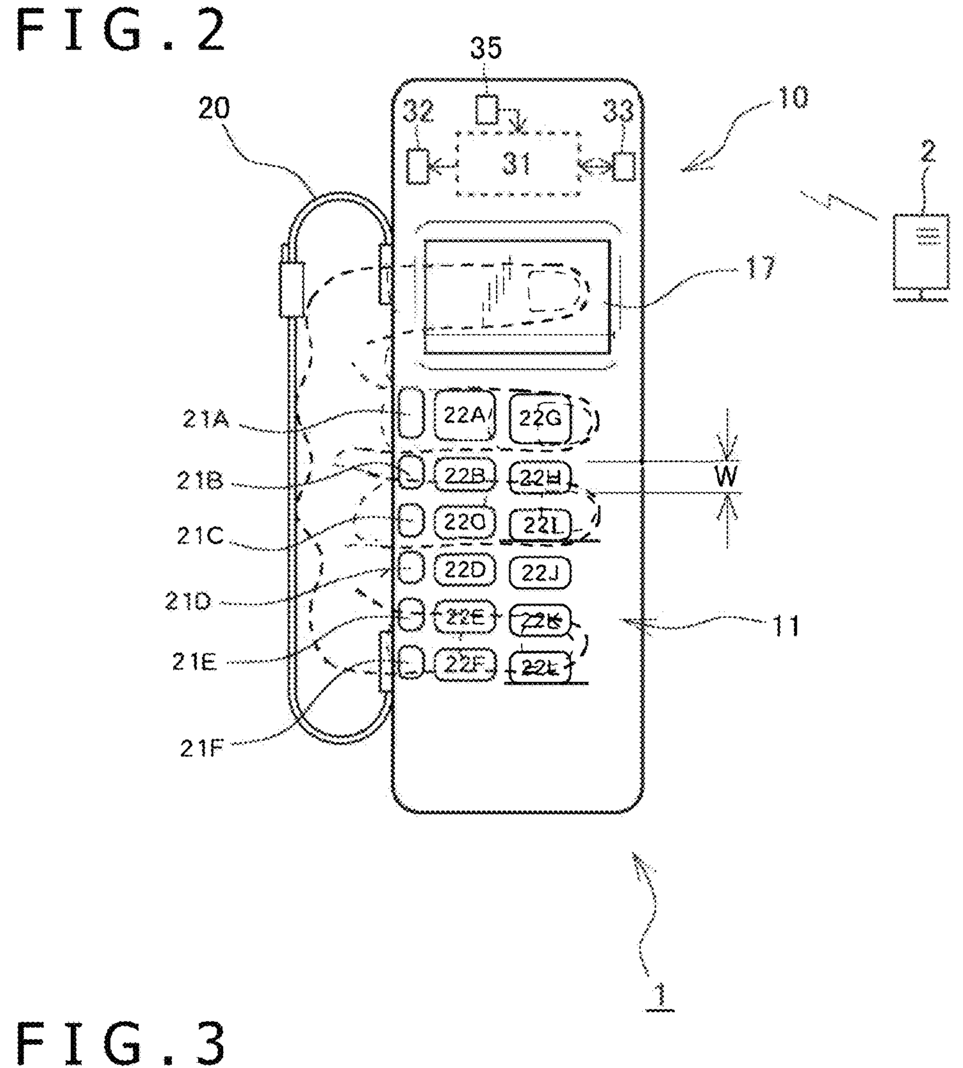
FIG. 2 is an explanatory diagram depicting an arrangement example of sensors on the controller apparatus according to the embodiment of the present invention.
FIG. 3 is an explanatory diagram depicting a definition example for deciding which sensor is used to detect fingers in the controller apparatus according to the embodiment of the present invention.

In FIG. 2, the respective electrostatic sensors 21S of the first sensors 21 are arranged in the row direction of the electrostatic sensors 22S of the second sensors 22 such that the first and second sensors 21 and 22 form a 3×6 lattice pattern (an oblique lattice pattern).

It is to be noted that the first and second sensors 21 and 22 are all electrostatic sensors in this example. However, the present embodiment is not limited to this example. Cameras, optical sensors, pyroelectric sensors, ultrasonic sensors, etc., may be used as long as information corresponding to the relative positional relation (a distance or a displacement, or a spatial position displacement) with a finger or a palm is obtained.

In addition, in one example of the present embodiment, a width w (a width in the longitudinal direction of the grip section 11) of a detection surface (a surface for measuring an electrostatic capacitance, or an opening surface for receiving infrared light if the second sensors 22 are infrared sensors) of at least some of the second sensors 22 is set to be shorter than a finger width of a typical user (a presumed user such as an average adult, for example). Accordingly, a second sensor 22 that only the corresponding finger touches is ensured.

In addition, the clearance between the adjacent second sensors 22 in the longitudinal direction of the grip section 11 is set to be shorter than the width w.

At this time, the width w of the second sensors 22 that are arranged in the index finger-side row (the swing button 17 side) may be larger than the width w of the remaining second sensors 22. This is in order to ensure that the middle finger is detected because the middle finger is expected to touch the second sensors 22 that are arranged in the index finger-side row. Therefore, the widths and lengths of the respective detection surfaces of the second sensors 22A, 22B, . . . , do not need to be uniformly set. Some of the widths may be set to be larger or smaller. Also, the second sensors 22A, 22B, . . . may have different lengths, as appropriate, for the respective purposes.

In this example, among the second sensors 22, the second sensors 22A and 22G which the middle finger is expected to touch are arranged over a larger width than the remaining second sensors 22B, 22C . . . .

In addition, the widths and lengths of the respective detection surfaces (for example, surfaces for measuring electrostatic capacitances if the first sensors 21 are also electrostatic sensors, or opening surfaces for receiving infrared light if the first sensors 21 are infrared sensors) of first sensors 21A, 21B, . . . do not need to be uniformly set. Some of the widths may be set to be larger or smaller. Also, the first sensors 21A, 21B, . . . may have different lengths, as appropriate, for the respective purposes.

The detectable range of the sensor section 15 of the operation section 12 is an angle range of a relatively wide angle, on the front surface side of the controller main body 10, from a left lateral surface side to a right lateral surface side of the controller main body 10 with respect to the normal direction of a surface of the sensor section 15, when viewed in the front surface direction from the controller main body 10. The sensor section 15 detects the thumb of the user within the detectable range. Then, the sensor section 15 detects the detection position of the thumb (an angle within the angle range), the distance from the sensor section 15 to the thumb of the user, and the like, and outputs detection result information including the detection position, the distance, and the like to the control section 31. For example, the sensor section 15 may be a camera, an optical sensor, a pyroelectric sensor, an ultrasonic sensor, an electrostatic sensor, or the like. Any sensor can be adopted for the sensor section 15.

The button operation section 16 includes a plurality of buttons that are arranged on the front surface side of the controller main body 10. These buttons are depressed by the user's thumb, etc., for example. In addition, at least one of the buttons included in the button operation section 16 may be depressable, and further, be tiltable. In this case, when the user's thumb tilts the button, the button operation section 16 outputs, to the control section 31, information for identifying the button on which the operation has been performed and information for indicating how the operation has been performed such as the tilt direction or the tilt amount (the amount corresponding to the tilt angle).

The swing button 17 is disposed in a position (on the rear surface side of the controller main body 10) that the user's index finger can reach when the user is holding the controller main body 10. The swing button 17 is depressed by the index finger of the user, and outputs information indicating the depression amount (the movement amount of the button) to the control section 31. Specifically, the swing button 17 can include a potentiometer, etc. However, the swing button 17 is not limited to this configuration as long as the swing button 17 can detect the depression amount.

In addition, the control section 31 includes a program control device such as a microcomputer, and works according to a program stored in storage means such as a memory. The program may be provided in a state of being stored in a computer readable and non-temporal recording medium, and then, be stored into the storage means.

In addition, the control section 31 is connected with the first and second sensors 21 and 22 and with the sensor section 15, button operation section 16, and swing button 17 of the operation section 12, receives various kinds of signals such as signals based on outputs from the first and second sensors 21 and 22 and signals indicating user operations inputted from the sensor section 15 and the button operation section 16, for example, and executes a process (hereinafter, referred to as an operation transmission process) of transmitting information regarding the operation to the information processing apparatus 2 on the basis of the received signals. The control section 31 includes a wireless communication interface such as Bluetooth (registered trademark) or a wired communication interface such as a universal serial bus (USB) or a wired local area network (LAN), for example. The control section 31 exchanges signals with the information processing apparatus 2 via the wireless communication interface or the wired communication interface.

In addition, in the present embodiment, the control section 31 controls operation of the controller apparatus 1 in an operation state of any one of a first state of executing the operation transmitting process, a second state, which is different from the first state, of executing a predetermined process based on a user contact state, and a third state (power saving operation state), which is different from any of the first state and the second state, of making a transition to the first or second state upon receiving a predetermined command from the outside (e.g., the information processing apparatus 2). Specific operation of the control section 31 will be explained later.

The vibration device 32 is a vibrator, for example, and presents vibration having a predetermined waveform according to a command inputted from the control section 31. At a certain vibration frequency, the vibration device 32 presents vibration that is audible as a sound.

The communication section 33 includes an interface such as a USB and a short-distance wireless communication interface such as Bluetooth. The communication section 33 is connected to be able to communicate with the information processing apparatus 2, and transmits information regarding an operation to the information processing apparatus 2 according to a command inputted from the control section 31. In addition, the communication section 33 receives a command from the information processing apparatus 2, and outputs the command to the control section 31. Further, in one example of the present embodiment, the communication section 33 may accept a Bluetooth Low Energy (BLE) signal even when the control section 31 is under the third state operation, for example. When receiving a BLE signal, the communication section 33 may check whether or not the signal includes predetermined information that is unique to the controller apparatus 1. When the signal includes such information, the communication section 33 may execute a process of outputting a signal to make a transition to the first or second state (what is generally called a wakeup process), to the control section 31.

The information processing apparatus 2 is a computer controller for home video game machines and the like, for example. The information processing apparatus 2 includes a processor, storage means such as a memory device or a disk device, input/output means that receives operation information inputted from the controller apparatus 1 and transmits the information to the processor, and display means that displays the information on a display or a head mounted display (HMD) according to a command from the processor.

The information processing apparatus 2 may be connected with the controller apparatus 1 through short-distance wireless communication such as Bluetooth, or may be connected with the controller apparatus 1 via a USB cable or the like. The information processing apparatus 2 executes a game program, for example, on the basis of information regarding a user operation received from the controller apparatus 1.

Detecting Hand Width

To execute the operation transmission process in the first state, the control section 31 obtains signals outputted from the first sensors 21 and estimates the widths of the user's hand in order to receive an operation. Specifically, the control section 31 uses a counter (a variable serving as a counter). The control section 31 resets the counter to "0," and then, checks output signals of the first sensors 21 (signals each indicating an electrostatic capacitance of the corresponding sensor 21S, or detection values), in order from the first sensor 21A which is disposed on the index finger side (the swing button 17 side).

In a case where the user with a relatively small hand holds the controller main body 10, some first sensors 21 do not detect any finger touch. For example, the four first sensors 21A, 21B, 21C, and 21D detect finger touches while first sensors 21E and 21F do not detect any finger touch. When the hand width is smaller, the number of the first sensors 21 that do not detect any finger touch becomes larger. However, the first sensor 21A which is the closest to the swing button 17 always detects a touch with the middle finger because the index finger is put on the swing button 17. Therefore, the first sensor 21 that is disposed on the farthest side from the swing button 17 is most likely to fail to detect a finger touch when the hand width is smaller.

In view of this, when the checked first sensor 21 has detected a finger touch (when a detection value outputted from the checked first sensor 21 is greater than a predetermined touch determination threshold), the control section 31 increments the counter by "1." In addition, when a first sensor 21 that has not detected a finger touch (the first sensor 21 that is outputting a detection value less than the predetermined touch determination threshold) is first found, or when checking all the first sensors 21 is completed, the control section 31 obtains, as hand width information, the counter value at this time point.

It is to be noted that, in a case where the user has a relatively large hand, all the first sensors 21A to 21F detect finger touches. In this case, the control section 31 continues incrementing the counter while sequentially checking the outputs in order from the output of the first sensors 21A, then finally determines that the first sensor 21F also has detected a finger touch, and increments the counter. Therefore, since the control section 31 determines that all the first sensors 21A to 21F have detected the finger touches and increments the counter by "1" for each finger touch, the counter value "6" is obtained when checking the last first sensor 21F is completed.

By using the obtained counter value, the control section 31 selects, from among the plurality of second sensors 22, second sensors 22 that detect bending and extending of the middle finger, the ring finger, and the little finger of the user, and outputs information for identifying the selected second sensors 22.

Specifically, this allocation is done by storing, in correspondence with a value of the above-mentioned counter, information for identifying second sensors 22 that respectively detect bending and extending of the middle finger, the ring finger, and the little finger of the user (FIG. 3).

In the example in FIG. 3, pieces of information MM, RM, and PM for identifying second sensors 22 that output signals (detection values) corresponding to spatial position displacement from parts that are relevant to the proximal phalanges of the middle finger, the ring finger, and the little finger and pieces of information MF, RF, and PF for identifying second sensors 22 that output signals corresponding to spatial position displacement from parts that are distal to the middle phalanges of the middle finger, the ring finger, and the little finger are held in correspondence with each counter value (W).

FIG. 3 indicates a specific example of definitions. These definitions can be determined in an empirical manner or any other different manner, and is assumed to be previously determined by a manufacturer of the controller apparatus 1 and stored in a memory in the control section 31. It is to be noted that these definitions may be rewritten according to a command inputted from the information processing apparatus 2, for example.

In the following explanation, the control section 31 selectively outputs information indicating the bending/extending states of the respective user's fingers on the basis of outputs from the second sensors 22 identified by the definitions and the counter value.

For example, in accordance with the definitions, the second sensors 22A, 22C, and 22D are determined as second sensors 22 that detect spatial position displacement from parts that are relevant to the proximal phalanges of the middle finger, the ring finger, and the little finger, as a result of the allocation corresponding to the counter value.

Then, the control section 31 selects information outputted from the second sensor 22A as information indicating bending/extending of the middle finger, selects information outputted from the second sensor 22C as information indicating bending/extending of the ring finger, further selects information outputted from the second sensor 22D as information indicating bending/extending of the little finger, and transmits and outputs the selected information to the information processing apparatus 2.

At this time, the control section 31 discards (refrains from outputting) signals outputted from the second sensors 22B, 22E, and 22F.

Here, when a finger is bent more, the finger comes closer or comes into contact with the grip section 11 of the controller apparatus 1. Therefore, a detection value which is a signal outputted from a selected second sensor 22 corresponding to the bent finger becomes greater when the distance between the finger and the sensor 22 is shorter. The detection value becomes maximum when the finger is in contact with the sensor 22. Hence, the magnitude of the detection value can be used as information that indicates the degree of bending/extending of each finger.

Search Time Process

Next, operation of the control section 31 when the controller apparatus 1 according to the embodiment of the present invention executes the second state of executing a predetermined process based on a user contact state will be explained.

In one example of the present embodiment, the control section 31 performs control to execute operation under the second state according to a command inputted from the information processing apparatus 2. Further, to execute the second state operation, the control section 31 uses the vibration device 32 as a sound generating device for generating sounds, and controls the vibration device 32 to generate a predetermined sound until the first sensors 21 or the second sensors 22 detect a user's touch.

In this example of the present embodiment, when connected (paired) with the controller apparatus 1 through wireless communication such as Bluetooth, the information processing apparatus 2 obtains predetermined unique information regarding the controller apparatus 1, such as a media access control (MAC) address of the controller apparatus 1, and stores the information as information for identifying the controller apparatus 1 with which communication has been performed before.

When a predetermined condition (a condition for reporting the position of the controller apparatus 1) is satisfied, the information processing apparatus 2 transmits a wakeup process signal to the controller apparatus 1 with which connection has been established before. Specifically, when it is assumed that the controller apparatus 1 of the present embodiment waits for a BLE signal and executes a wakeup process upon receiving a BLE signal of predetermined information unique to the controller apparatus 1, such as the MAC address, as previously explained, the information processing apparatus 2 transmits the BLE signal including the MAC address stored as information for identifying the controller apparatus 1 with which connection has been established before.

Here, for example, conditions for transmitting a wakeup process signal from the information processing apparatus 2, may include (1) a condition that connection with the controller apparatus 1 is not established (no information is received from the controller apparatus 1) for a predetermined time period after power is turned on, or (2) a condition that information regarding an operation is not received from the controller apparatus 1 (the user does not perform any operation) for a predetermined time period after the HMD is mounted on the user (whether or not the HMD is mounted may be determined by taking an image of the HMD with an undepicted camera and estimating the posture of the HMD, for example. Such a widely-known determination method can be adopted, and thus, the detailed explanation thereof will be omitted here).

In addition, the control section 31 of the waken-up controller apparatus 1 makes a transition from the third state operation to the second state operation, and causes vibration of the vibration device 32 at an audible wavelength to generate a sound. The control section 31 controls the vibration device 32 to continue generating the sound until a user finger touch is detected by any one of the first sensors 21 or the second sensors 22.

Figure 4:
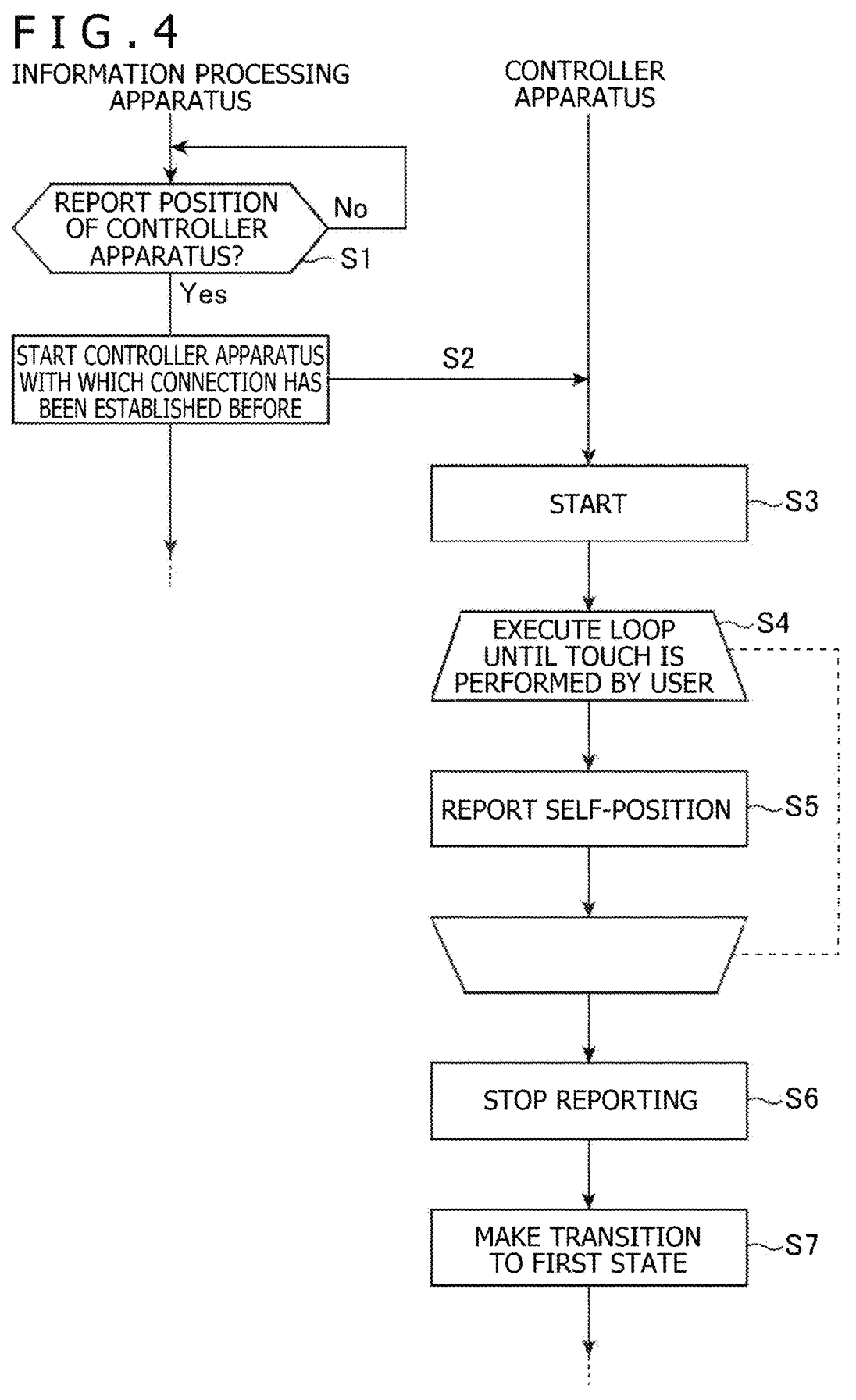

According to this example of the present embodiment, as illustrated in FIG. 4, for example, when a condition that no operation is performed for a certain time period after the HMD is mounted on the user is satisfied (S1), the information processing apparatus 2 determines that there is a possibility that the user cannot find the controller apparatus 1, and transmits a wakeup process signal to the controller apparatus 1 with which connection has been established before (S2). Then, the controller apparatus 1 is started according to the signal (S3), and is operated in a mode of being searched for by the user (one example of the second state operation in the present embodiment). Until a user hand/finger touch is detected (S4), the controller apparatus 1 reports the self-position by vibration (S5). Accordingly, even when the HMD narrows the visual field of the user (if the HMD is a transmission type) or makes the real space invisible to the user (if the HMD is a non-transmission type), the user can be informed of the position of the controller apparatus 1 by vibrations or sounds, and easily reach for the controller apparatus 1 by extending the hand to the direction indicated by the vibrations or sounds.

Then, after a user hand/finger touch is detected, the controller apparatus 1 stops reporting (S6), shifts to the first state (S7), receives a user operation, and starts transmitting information regarding the operation to the information processing apparatus 2.

Alternatively, in this example, the control section 31 of the controller apparatus 1 may stop the vibration and proceed to the next process after a user hand/finger touch is detected. After a user hand/finger touch is detected, the control section 31 may perform control to prevent a transition to the first state until the user holds the controller apparatus 1 in a proper manner.

Here, the proper manner in this example of the present embodiment means that the controller apparatus 1 is fixed to the user's hand with the fixing tool 20. In order to detect the proper manner, the control section 31 detects a user finger touch, stops the vibration, sets a counter (a variable serving as a counter), resets the counter to "0," checks the output signals of the first sensors 21 (signals indicating the electrostatic capacitances of the corresponding sensors 21, or detection values) in order from the first sensor 21A which is disposed on the index finger side (the swing button 17 side), and increments the counter by "1" each time the checked first sensor 21 has detected a finger touch (when the detection value outputted from the checked first sensor 21 is greater than a predetermined touch determination threshold), during the second state operation. In addition, when a first sensor 21 that has not detected a finger touch (the first sensor 21 that is outputting a detection value less than the predetermined touch determination threshold) is first found, or when checking all the first sensors 21 is completed, the control section 31 obtains, as hand width information, the counter value at this time point.

Subsequently, in a case where the obtained hand width information at this time point is not greater than the number (for example, "3") of fingers that shall come into contact even if the user is a relatively small person, the control section 31 determines that the user is not holding the controller apparatus 1 in the proper manner, and resets the counter to "0." Then, the control section 31 checks the output signals from the first sensors 21 again.

Further, in a case where the value obtained as the hand width information is greater than the number of fingers that shall come into contact even if the user is a relatively small person, the control section 31 determines that the user is holding the controller apparatus 1 in the proper manner, and makes a transition to the first state (exits from the mode of being searched for). Thereafter, operation of receiving a user operation and transmitting information regarding the operation to the information processing apparatus 2 is started.

Example of Reporting Approach

Further, in one example of the present embodiment, when the second state operation is being executed as the mode of being searched for, the detection sensitivity of the first sensors 21 and the second sensors 22 may be set to be higher than the detection sensitivity set during the first state operation.

Specifically, in the first state, the sensor circuit 21C, 22C of the first/second sensor 21, 22 is configured to output a value corresponding to a spatial displacement (D) from a user finger to be detected, in multi-stages from "0" (for example, an 8-bit signal) according to the electrostatic capacitance (C) of the electrostatic sensor 21S, 22S. In contrast, in the second state (the mode of being searched for), when the electrostatic capacitance (C) of the electrostatic sensor 21S, 22S is equal to or less than a predetermined threshold Cth, the sensor circuit 21C, 22C of the first/second sensor 21, 22 is configured to output "0," and, when the electrostatic capacitance (C) is within a range greater than the threshold Cth or to the maximum electrostatic capacitance Cmax (the state where the user finger is in contact), a detection value V to be outputted from the sensor circuit 21C, 22C is $$V=C\times(V\max-V\min)/(C\max-Cth)+V\min$$

where Vmin is greater than "0," Vmax represents the output maximum value ("255" if the 8-bit signal is adopted), and C represents the electrostatic capacitance of the corresponding electrostatic sensor 21S, 22S. It is to be noted that Cth may be the lower limit detection value in this case.

Then, the control section 31 controls vibration of the vibration device 32 in such a way that the vibration manner varies according to whether the maximum one of the detection values outputted from the first and second sensors 21 and 22

(1) is "0" (the state where the user finger is not close), (2) is equal to or greater than Vmin but is less than Vmax (the state where the user finger is close but is not in contact), or (3) is equal to Vmax (the detection value indicating that the finger is in contact).

For example, the control section 31 may control the vibration device 32 in such a way that the vibration intensity (the amplitude of the vibration waveform) for (1) where the maximum detection value is “0” is higher than the vibration intensity for (2) where the maximum detection value is equal to or greater than Vmin but is less than Vmax. Further, when the maximum detection value is (3) equal to Vmax, the control section 31 may control the vibration device 32 to generate vibration having a predetermined waveform for a certain time period and then stop the vibration.

In addition, when the maximum detection value is (2) equal to or greater than Vmin but is less than Vmax, the control section 31 may lower (or increase) the vibration frequency with an increase of the maximum detection value, or may shorten (or lengthen) a non-vibration interval if the vibration is intermittently generated. As a result of such control, when a user finger comes close to the controller apparatus 1, the vibration changes. Accordingly, even in a case where the HMD shields the visual field, the user can easily find the controller apparatus 1.

Plurality of Controller Apparatuses That are Used Simultaneously

Further, in another example of the present embodiment, the number of the controller apparatuses 1 connected with the information processing apparatus 2 is not limited to one, and a plurality of the controller apparatuses 1 may be used simultaneously. For example, the controller apparatuses 1 may be held with the left hand and the right hand of the user, respectively.

In this case, the information processing apparatus 2 and the controller apparatuses 1 may perform the above-mentioned processes for each of the controller apparatuses 1. If so, until the user finds and touches all the controller apparatuses 1, the controller apparatus 1 that has not been found continues vibration.

In addition, when connected with a plurality of the controller apparatuses 1, the information processing apparatus 2 may store information indicating a combination of the simultaneously connected controller apparatuses 1. Here, the information indicating a combination of the controller apparatuses 1 may be an identification information list (in which the order is not determined) of the connected controller apparatuses 1 (which may be MAC addresses or the like if the controller apparatuses 1 can be connected through Bluetooth, for example).

In this example, conditions for transmitting a wakeup process signal from the information processing apparatus 2 may further include a condition that the user is holding a certain controller apparatus 1 (that is under the first state operation) while the HMD is mounted on the user, a list including information for identifying the controller apparatus 1 is stored, and not all of the controller apparatuses 1 identified by information included in the list are connected with the information processing apparatus 2. In this case, the information processing apparatus 2 may be controlled to transmit a wakeup process signal to the controller apparatus 1 with which connection is not established, without transmitting a wakeup process signal to the connected controller apparatus 1.

According to this example, in a case where, for example, the user has operated a controller apparatus 1*a* and a controller apparatus 1*b* with the left and right hands respectively before (in a case where the information processing apparatus 2 stores a list of identification information regarding the controller apparatuses 1*a* and 1*b* because these controller apparatuses have been connected with the information processing apparatus 2 simultaneously before) and the HMD is mounted on the user who is holding the controller apparatus 1*a* with one hand while connection with the controller apparatus 1*b* is not established, the information processing apparatus 2 transmits a wakeup process signal to the controller apparatus 1*b* which has been connected with the information processing apparatus 2 before simultaneously with the controller apparatus 1*a*.

Then, the controller apparatus 1*b* executes the above-mentioned second state operation to vibrate the vibration device 32, and the position of the controller apparatus 1*b* is reported to the user. Accordingly, after wearing the HMD with one hand, the user can be informed of the position of the controller apparatus 1*b*.

Case where Camera-Equipped HMD is Used

Further, the case where the controller apparatus 1 causes the vibration device 32 to vibrate during the second state has been explained. However, the present embodiment is not limited to this case. For example, in a case where the controller apparatus 1 is equipped with a loudspeaker, a sound (for example, a beep) may be generated from the loudspeaker in place of or in addition to vibration of the vibration device 32.

Alternatively, when the user wears an HMD equipped with a front-side camera (for taking an image in the direction of the user's visual line), an image (of the real space) taken by the camera of the HMD may be displayed. In addition, in a case where the controller apparatus 1 is equipped with a light emitting device such as a light emitting diode (LED), an image taken by the camera as described above may be presented, and further, the light emitting device may be caused to blink or light to cause the information processing apparatus 2 to recognize the position of the controller apparatus 1 in the image taken by the camera. An image in which an image indicating a region (of the image taken by the camera) recognized, on the basis of the recognition result, as the position of the controller apparatus 1 is superimposed on the image taken by the camera may be outputted to the HMD such that the image is presented to the user.

Case of Obtaining Agreement from User

It is to be noted that the example in which, when a predetermined condition for outputting a wakeup process signal to the controller apparatus 1 from the information processing apparatus 2 is satisfied, a wakeup process signal is outputted to the controller apparatus 1 without a user's agreement has been explained. However, the present embodiment is not limited to this example.

For example, in a case where the HMD is mounted on the user, the information processing apparatus 2 that has determined that the above condition is satisfied may indicate, on the HMD, an inquiry regarding whether or not to output a wakeup process signal to the controller apparatus 1, determine whether or not the user performs an affirmative action such as nodding or gazing an affirmative indication in response to the inquiry. When the user performs an affirmative action, the information processing apparatus 2 may output a wakeup process signal to the controller apparatus 1. It is to be noted that a widely-known method can be adopted to determine a user action, and thus, a detailed explanation thereof will be omitted here.

Operation Predicting Process

Further, in the present embodiment, the second state operation of the control section 31 of the controller apparatus 1 is not limited to the above-mentioned examples. For example, in the second state operation, the control section 31 may predict whether or not the user will start an operation, on the basis of the contact state of the user with the controller apparatus 1. In this case, when the prediction result indicates that the user will start an operation, the control section 31 starts the first state operation.

In this example, it is assumed that, when making a transit from the third state (the power saving operation state) to another state, the control section 31 of the controller apparatus 1 necessarily makes a transit to the second state. It is assumed that transition from the third state directly to the first state is not made.

In addition, here, a process in which the control section 31 predicts whether or not the user will start an operation is as follows, for example.

Figure 5:
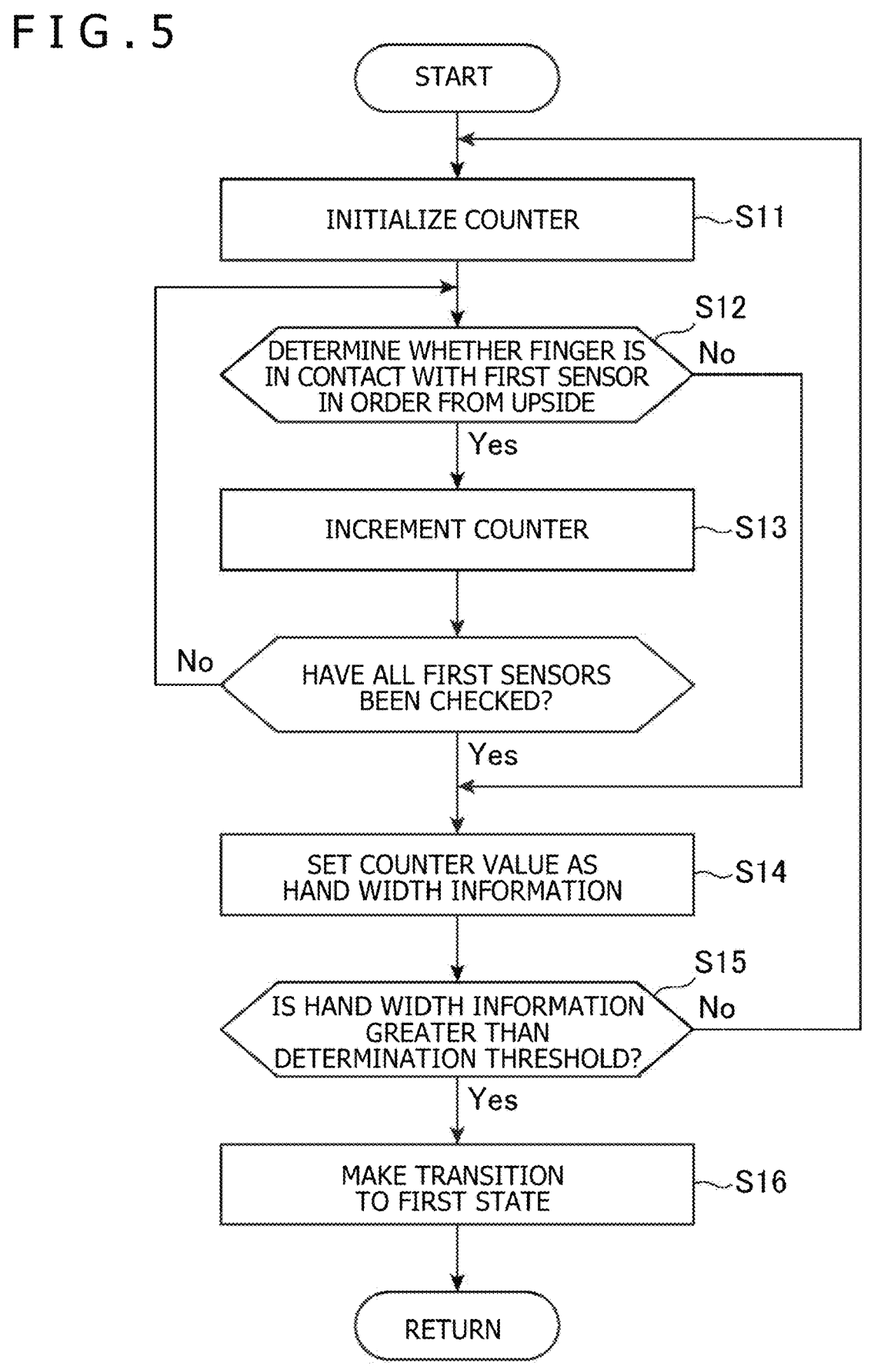

When the user is holding the controller apparatus 1 in the proper manner as previously explained, the control section 31 may predict that the user will start an operation. In this example, the control section 31 uses the first sensor 21 as a contact sensor for detecting whether or not a user finger is in contact, and makes the prediction on the basis of a detection result obtained by the contact sensor. Specifically, also in this example, the control section 31 performs the following process. That is, as indicated in FIG. 5, when the second state operation is started, the control section 31 initializes a counter (a variable serving as a counter) by resetting the counter to "0" (S11). Then, the control section 31 checks output signals (signals indicating the electrostatic capacitances of the corresponding sensors 21S, or detection values) of the first sensors 21 in the order from the first sensor 21A which is disposed on the index finger side (the swing button 17 side), and determines whether or not the checked first sensor 21 has detected a finger touch (whether the detection value outputted from the checked first sensor 21 is greater than a predetermined touch determination threshold) (S12).

Then, each time the checked first sensor 21 has detected a finger touch (Yes in S12), the control section 31 increments the counter by "1" (S13). The control section 31 repeatedly executes steps S12 and S13 until a first sensor 21 that has not detected a finger (a first sensor 21 that outputs a detection value lower than the predetermined touch determination threshold) is first found, or until checking all the first sensors 21 is completed. The control section 31 obtains, as hand width information, the counter value at a time point where this loop is exited (S14).

Then, the control section 31 checks whether or not the hand width information obtained here is greater than a predetermined number (determination threshold: "3," for example) of fingers that shall come into contact even if the user is a relatively small person (S15). In a case where the hand width information is not greater than the predetermined number (No in S15), the control section 31 determines that the user is not holding the controller apparatus 1 in the proper manner, returns to step S11 to reset the counter to "0," and then checks the output signals of the first sensors 21 again.

Further, in a case where the obtained hand width information is greater than the number of fingers that shall come into contact even if the user is a relatively small person (Yes in S15), the control section 31 determines that the user is holding the controller apparatus 1 in the proper manner, predicts that the user will start an operation, and thus, makes a transit to the first state (S16). Thereafter, the control section 31 starts operation of receiving a user operation and transmitting information regarding the operation to the information processing apparatus 2.

Further, in this example, when the hand width information obtained by the above-mentioned manner is not greater than the number (for example, "3") of fingers that shall come into contact even if the user is a relatively small person (No in S15) but when the second sensors 22 detect a user finger touch, the control section 31 may give a request to indicate an alarm to the information processing apparatus 2.

In still another example, in a case where the hand width information obtained by the above-mentioned manner becomes greater than the number (for example, "3") of fingers that shall come into contact even if the user is a relatively small person, after the second sensors 22 detect a user finger touch, a request to indicate the alarm may also be given to the information processing apparatus 2.

In this example, upon receiving the request to indicate the alarm from the controller apparatus 1, the information processing apparatus 2 may display a message "Wear the controller properly" to inform the user that the worn state of the controller apparatus 1 is not correct.

According to this example, when the user holds the controller apparatus 1 mistakenly with the opposite hand (that is, when the controller apparatus 1 for the right hand is held with the left hand, for example), it is possible to issue an alarm upon detection of a user finger touch through the second sensors 22 prior to detection of a user finger touch through the first sensors 21.

In yet another example, the controller apparatus 1 may include an acceleration sensor 35 in the controller main body 10. At this time, the control section 31 of the controller apparatus 1 may give a request to indicate an alarm to the information processing apparatus 2, when the hand width information obtained by the above-mentioned manner is not greater than the number (for example, "3") of fingers that shall come into contact even if the user is a relatively small person but when the acceleration sensor 35 detects movement of the controller apparatus 1 (or detects an acceleration greater than a predetermined acceleration threshold).

It is to be noted that the control section 31 here is configured to predict that the user will start an operation when the user is holding the controller apparatus 1 in the expected proper manner, but the present embodiment is not limited to this example.

For example, the control section 31 of the controller apparatus 1 may predict that the user will start an operation on condition that a finger touches the swing button 17 (the swing button 17 is depressed even slightly, or a contact sensor such as an electrostatic sensor is provided on the button top of the swing button 17 such that the contact sensor conducts a detection).

Alternatively, the control section 31 of the controller apparatus 1 may predict that the user will start an operation, on the basis of a condition of the sensors (and the buttons) from which it can be determined that the user is holding the controller apparatus 1 in what is generally called a default position. In one example, the control section 31 may predict that the user will start an operation on condition that the hand width information (the above-mentioned count value) obtained in the above-mentioned manner on the basis of the detection result obtained by the first sensors 21 is equal to or greater than the number (for example, "3") of fingers that shall come into contact even if the user is a relatively small person and that a finger touches the swing button 17 (the swing button 17 is depressed even slightly or a contact sensor such as electrostatic sensor is provided on the button top of the swing button 17 such that the contact sensor conducts a detection).

According to these methods, the control section 31 continues the second state process while the controller apparatus 1 is lifted up simply in order to be moved, for example, and no information regarding an operation is transmitted from the controller apparatus 1 to the information processing apparatus 2. During this time, the controller apparatus 1 is connected with the information processing apparatus 2 if the information processing apparatus 2 is on, and the information processing apparatus 2 is caused to output information for providing guidance on a predetermined manner of holding the controller apparatus 1.

In addition, when the user is holding the controller apparatus 1 in the expected proper manner, the control section 31 makes a transition from the second state process to the first state process, and the controller apparatus 1 outputs information regarding a user operation to the information processing apparatus 2 according to the user operation.

REFERENCE SIGNS LIST

- 1: Controller apparatus
- 2: Information processing apparatus
- 10: Controller main body
- 11: Grip section
- 12: Operation section
- 15: Sensor section
- 16: Button operation section
- 17: Swing button
- 20: Fixing tool
- 21: First sensor
- 22: Second sensor
- 31: Control section
- 32: Vibration device
- 33: Communication section
- 35: Acceleration sensor
- 100: Information processing system

The invention claimed is:

1. An information processing system comprising:

a controller apparatus that is operated by a user in a contact manner; and an information processing apparatus configured to communicate with the controller apparatus, wherein the controller apparatus is configured to work in an operation state of either a first state of receiving a user operation and transmitting information regarding the received user operation to the information processing apparatus or a second state of executing a predetermined process based on a user contact state, the second state being different from the first state, wherein, while operating in the second state, the controller apparatus is configured to: i) generate a notification signal indicative of a position of the controller apparatus until an initial contact between the controller apparatus and a hand of the user is detected; and ii) transition to the first state in response to verifying a mounting state of the controller apparatus.

2. A controller apparatus configured to communicate with an information processing apparatus, wherein the controller apparatus is configured to work in an operation state of either a first state of receiving a user operation and transmitting information regarding the received user operation to the information processing apparatus or a second state of executing a predetermined process based on a user contact state, the second state being different from the first state, wherein the controller apparatus is configured to transition to the second state based on receiving a wakeup signal from the information processing apparatus, and while operating in the second state, the controller apparatus is configured to: i) generate a notification signal indicative of a position of the controller apparatus until an initial contact between the controller apparatus and a hand of a user is detected; and ii) transition to the first state in response to verifying a mounting state of the controller apparatus.

3. The controller apparatus according to claim 2, further comprising:

a vibrator configured to generate a sound as the notification signal, wherein, in the second state, the vibrator configured to generate the sound according to a command from the information processing apparatus until the initial contact is detected.

4. The controller apparatus according to claim 3, further comprising:

a sensor configured to detect a spatial position displacement from a finger of the user, wherein, when the sensor is configured to detect that the finger of the user is approaching the controller apparatus during the second state, the vibrator is controlled to generate the sound having at least one of a waveform or a vibration frequency that is different from a sound generated when the sensor does not detect that the finger of the user is approaching the controller apparatus.

5. The controller apparatus according to claim 2, further comprising a processor configured to predict whether or not the user will start an operation on a basis of the user contact state during the second state, wherein the transitioning to the first state is based on the prediction indicating that the user will start the operation.

6. The controller apparatus according to claim 5, wherein the controller apparatus is configured to be operated while being mounted on the hand of the user via a fixing tool, the controller apparatus comprises a contact sensor configured to detect whether or not a finger of the user touches the controller apparatus, the contact sensor being disposed on a surface of the controller apparatus with which the finger of the user is in contact when the controller apparatus is mounted on the hand of the user, and the prediction is based on a detection result obtained by the contact sensor.

7. The controller apparatus according to claim 2, wherein verifying the mounting state of the controller apparatus comprises measuring of a hand width.

8. The controller apparatus according to claim 7, wherein the measuring of the hand width comprises:

detecting contact or proximity of a plurality of fingers via a plurality of first sensors arranged in a row along a grip section of the controller apparatus; and determining a number of the first sensors configured to detect the contact or the proximity, wherein the mounting state is verified based on the number of the first sensors being greater than or equal to a predetermined threshold.

9. The controller apparatus according to claim 8, further comprising:

a plurality of second sensors arranged in a matrix on the grip section at a position different from the plurality of first sensors, the plurality of second sensors configured to detect a distance to the plurality of fingers of the user, wherein verifying the mounting state is based on a detection result from the plurality of second sensors.

10. The controller apparatus according to claim 2, wherein, in the second state, the controller apparatus is configured to operate a sensor at a detection sensitivity that is higher than a detection sensitivity used in the first state.

11. The controller apparatus according to claim 2, wherein the notification signal comprises a vibration having a waveform that is modulated based on a distance between the hand and the controller apparatus.

12. The controller apparatus according to claim 2, wherein the controller apparatus is configured to be fixed to the hand of the user by a fixing tool such that the controller apparatus remains in contact with a palm of the hand.

13. A control method for a controller apparatus configured to communicate with an information processing apparatus, the method comprising:

controlling the controller apparatus to work in an operation state of either a first state of receiving a user operation and transmitting information regarding the received user operation to the information processing apparatus or a second state of executing a predetermined process based on a user contact state, the second state being different from the first state;

wherein while operating in the second state, i) generating a notification signal indicative of a position of the controller apparatus until an initial contact between the controller apparatus and a hand of a user is detected, and ii) transitioning to the first state in response to verifying a mounting state of the controller apparatus.

14. The control method according to claim 13, wherein verifying the mounting state of the controller apparatus comprises measuring of a hand width.

15. The control method according to claim 14, wherein the measuring of the hand width comprises:

detecting contact or proximity of a plurality of fingers via a plurality of first sensors arranged in a row along a grip section of the controller apparatus; and determining a number of the first sensors configured to detect the contact or the proximity, wherein the mounting state is verified based on the number of the first sensors being greater than or equal to a predetermined threshold.

16. The control method according to claim 15, wherein the controller apparatus comprises a plurality of second sensors arranged in a matrix on the grip section at a position different from the plurality of first sensors, the control method further comprising detecting, by the plurality of second sensors, a distance to the plurality of fingers of the user, wherein verifying the mounting state is based on a detection result from the plurality of second sensors.

17. The control method according to claim 13, further comprising:

operating, in the second state, a sensor at a detection sensitivity that is higher than a detection sensitivity used in the first state.

18. The control method according to claim 13, wherein the notification signal comprises a vibration having a waveform that is modulated based on a distance between the hand and the controller apparatus.

19. The control method according to claim 13, wherein the controller apparatus is configured to be fixed to the hand of the user by a fixing tool such that the controller apparatus remains in contact with a palm of the hand.

20. A non-transitory computer-readable storage medium storing instructions for causing a computer included in a controller apparatus to execute the instructions to perform operations comprising:

controlling the controller apparatus to work in an operation state of either a first state of receiving a user operation and transmitting information regarding the received user operation to an information processing apparatus or a second state of executing a predetermined process based on a user contact state, the second state being different from the first state;

wherein, while operating in the second state, i) generating a notification signal indicative of a position of the controller apparatus until an initial contact between the controller apparatus and a hand of a user is detected, and ii) transitioning to the first state in response to verifying a mounting state of the controller apparatus.

* * * * *